United States Patent

[11] 3,599,546

| [72] | Inventor | Donald M. Harvey |
| | | Webster, N.Y. |
| [21] | Appl. No. | 853,434 |
| [22] | Filed | Aug. 27, 1969 |
| [45] | Patented | Aug. 17, 1971 |
| [73] | Assignee | Eastman Kodak Company |
| | | Rochester, N.Y. |

[54] EXPOSURE CONTROL WITH LOW LIGHT SIGNAL
12 Claims, 4 Drawing Figs.

[52] U.S. Cl. .................................................... 95/10 C,
                                                                95/64 D
[51] Int. Cl. ...................................................... G03b 7/08,
                                                                G03b 17/20
[50] Field of Search .......................................... 95/10 C, 64

[56] References Cited
UNITED STATES PATENTS

| 3,040,643 | 6/1962 | Rentschler ................... | 95/64 |
| 3,082,674 | 3/1963 | Bagby ........................... | 95/64 |
| 3,205,569 | 9/1965 | Nerwin et al. ................ | 29/407 |
| 3,220,326 | 11/1965 | Scudder ....................... | 95/10 C |
| 3,482,497 | 12/1969 | Ernisse ......................... | 95/64 X |
| 3,491,664 | 1/1970 | Ernisse ......................... | 95/64 X |
| 3,500,731 | 3/1970 | Bresson et al. ................ | 95/64 X |

FOREIGN PATENTS

| 1,364,561 | 7/1912 | France .......................... | |
| 1,385,773 | 12/1964 | France .......................... | |

*Primary Examiner*—Joseph F. Peters, Jr.
*Attorneys*—Robert W. Hampton and Daniel E. Sragow ABSTRACT: The disclosure relates to cameras of the type provided with an automatic exposure control system including an armature which assumes one of two positions according to whether an electromagnet is energized above or below a predetermined energization level as a function of the intensity of scene illumination detected by a photocell. During the initial movement of a shutter operating member, the armature first serves to provide a warning signal if scene illumination is below a predetermined energization level. In response to further movement of the shutter operating member, the warning signal is terminated, whereupon the same armature then serves to adjust an exposure controlling element of the camera.

PATENTED AUG 17 1971 3,599,546

DONALD M. HARVEY
INVENTOR.

BY Daniel E. Sayor
Robert W Hampton
ATTORNEYS

EXPOSURE CONTROL WITH LOW LIGHT SIGNAL

REFERENCE TO RELATED APPLICATIONS

Reference is hereby made to commonly assigned U.S. Pat. application, Ser. No. 623,088, entitled Automatic Exposure Control Means for Cameras, filed in the name of Paul J. Ernisse on Mar. 14, 1967, and to commonly assigned U.S. Pat. application, Ser. No. 790,359, entitled Low Light Signal Device for Photographic Cameras, filed in the name of Paul J. Ernisse on Jan. 10, 1969.

BACKGROUND OF THE INVENTION

1. Field of the Invention

The present invention relates to exposure control devices of the type in which an armature assumes one of two positions according to whether an electromagnet is energized above or below a predetermined energization level as a function of the intensity of scene illumination detected by a photocell. More particularly, the invention concerns an improvement to such devices whereby the same armature serves to first operate a low light signal device and thereafter to adjust an exposure controlling element.

2. Description of the Prior Art

Representative automatic exposure control devices of the general type to which the present invention relates are disclosed in commonly assigned U.S. Pat. application, Ser. No. 623,088, entitled Automatic Exposure Control Means for Cameras, filed in the name of Paul J. Ernisse on Mar. 14, 1967, and in commonly assigned U.S. Pat. application, Ser. No. 790,359, entitled Low Light Signal Device for Photographic Cameras, filed in the name of Paul J. Ernisse on Jan. 10, 1969. In such devices, an electromagnet is energized to an energization level functionally related to the scene illumination intensity detected by a photocell. A plurality of armatures are movably supported adjacent the electromagnet and are resiliently biased to respective first positions from which they are magnetically moved in sequence to respective second positions in response to the energization of the electromagnet to corresponding progressively higher energization levels. Typically, three armatures are provided, the most sensitive being employed to produce a low light signal if scene illumination is below a the objective minimum intensity required to produce a satisfactory exposure. The other two armatures carry diaphragm blades movable into alignment with the objective lens to provide a maximum lens aperture when both of those armatures remain in their respective first positions, to provide an intermediate aperture when only the more sensitive of those two armatures is moved to its second position; and to provide a minimum aperture when both of the two armatures are in their respective second positions. Accordingly, it will be apparent that since in such systems each armature can assume only two predetermined positions, the employment of one armature to provide a low light signal limits the number of available lens apertures to the total number of armatures employed.

SUMMARY OF THE INVENTION

In accordance with the present invention, an exposure control device of the type described above is simplified and reduced in cost by enabling one of the exposure regulating armatures to perform a dual function by also serving to control the low light signal. Briefly, this objective is accomplished in accordance with the invention by employing an armature to control the low light signal only during initial movement of the shutter operating member, which thereafter causes the low light signal system to be disabled. The same armature then serves to adjust a diaphragm blade or analogous exposure controlling element before the shutter is operated.

Various means for practicing the invention and other advantages and novel features thereof will be apparent from the following detailed description of an illustrative preferred embodiment of the invention, reference being made to the figures of the accompanying drawing in which like reference numerals denote like elements.

DESCRIPTION OF THE ILLUSTRATIVE PREFERRED EMBODIMENT

Figure 1:
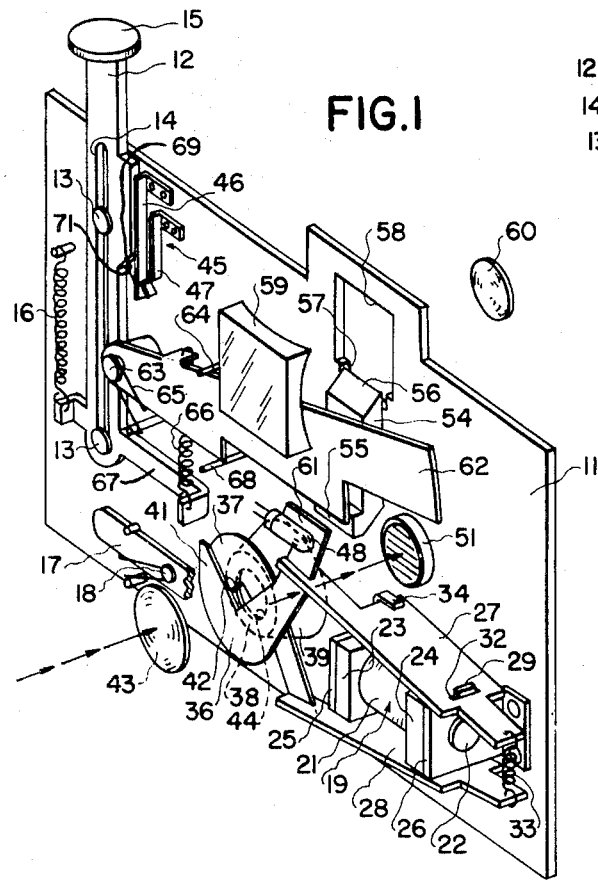
FIG. 1 is a perspective view of a somewhat simplified camera mechanism plate incorporating a preferred embodiment of the present invention.

The illustrative embodiment of the invention shown in FIG. 1 of the accompanying drawing comprises a vertical mechanism plate 11 which is mounted within a camera housing, not shown. A shutter operating slide 12 is mounted to the mechanism plate by rivets 13 extending through elongate slot 14 and is provided at its upper end with an externally accessible pushbutton 15 by which the slide can be depressed manually against the influence of spring 16. Shutter operating lever 17 is pivoted to the mechanism plate by pivot stud 18 and is adapted to operate the camera shutter, not shown, when it is engaged and pivoted about stud 18 by slide 12 during the final stage of manual depression of the latter.

An electromagnet 19 comprises a coil 21 wound on a cylindrical core 22 between rectangular pole pieces 23 and 34, which are attached to the mechanism plate by respective nonmagnetic bracket members 25 and 26. Armatures 27 and 28, made of ferromagnetic material, are supported above and below the electromagnet and are positioned for rocking movement between the positions shown in solid lines in FIGS. 1 and 2 and in phantom lines in FIG. 2 by respective ears 29 and 31, which project from bracket member 26 and are received freely in corresponding slots in the armatures, as shown at 32 in FIG. 1. The ends of the two armatures 27 and 28 adjacent bracket member 26 are connected by a spring 33, which biases the opposite ends of the armatures apart and into respective engagement with stop fingers 34 and 35 carried by bracket member 25. Accordingly, whenever the electromagnet is deenergized, the two armatures are resiliently maintained in their respective positions shown in solid lines in FIGS. 1 and 2, with the upper armature spaced slightly further from pole piece 23 then the lower armature 28. Due to this difference in spacing, it will be apparent that the lower or "weak" armature moves to its "in" position shown in broken lines in FIG. 2 in response to energization of the electromagnet to a predetermined energization level lower than that required to effect similar movement of the upper or "strong" armature.

Beyond bracket member 25, the ends of armatures 27 and 28 carry respective overlapping diaphragm blades 36 and 37 located forwardly of aperture wall 38 at the front of support cone 39 of the mechanism plate. Blades 36 and 37, in turn, are provided with respective opposed notches 41 and 42 defining a variable rectangular aperture opening in alignment with the camera's objective lens 43 and with a fixed aperture provided by opening 44 in wall 38. Thus, the maximum effective aperture of the lens is defined by opening 44 if both armatures are in their "out" positions shown in solid lines in FIGS. 1 and 2; an intermediate effective lens aperture is provided by notch 42 overlapping opening 44 when only armature 28 is attracted to its "in" position; and a minimum effective aperture is provided by the cooperation of both notches when both apertures are attracted to their "in" positions.

Figure 3:
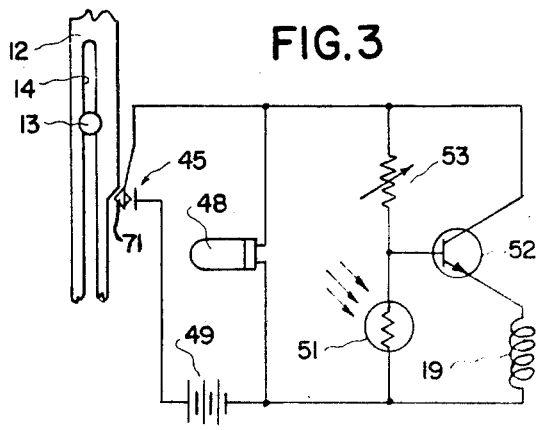
FIG. 3 is a schematic diagram of the electrical circuit incorporated in the embodiment of the invention illustrated in FIGS. 1 and 2.
Figure 2:
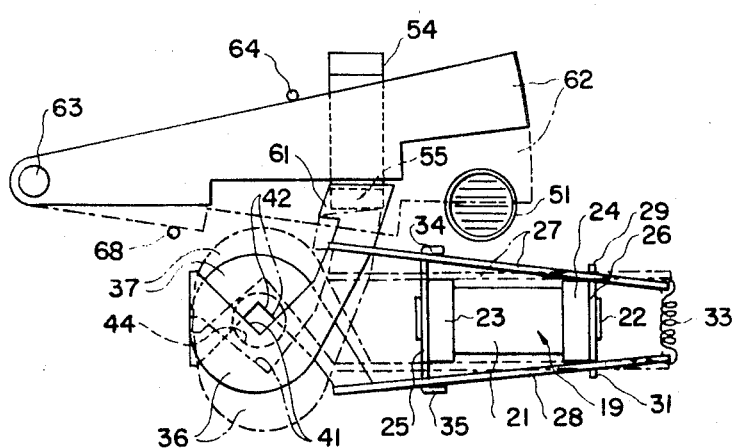
FIG. 2 is a schematic view showing different positions of the illustrated elements of the structure depicted in FIG. 1.

The electrical circuit of the embodiment of the invention shown in FIGS. 1 and 2 is depicted in FIG. 3 and includes a normally open switch 45 comprising a pair of switch blades 46 and 47 (FIG. 1). A signal lamp 48, supported by appropriate means, not shown, is wired in series with switch 45 and battery 49 and therefore is illuminated whenever switch 45 is closed. A photoresponsive magnet energizing circuit comprising photoresistive photocell 51 and NPN transistor 52 is similarly energized by battery 49 whenever switch 45 is closed, to thereby energize electromagnet 19 in inverse proportion to the intensity of scene illumination detected by the photocell through an appropriate window in the camera housing. A variable resistor 53 in the generally conventional magnet energizing circuit provides means for initially adjusting the response of that circuit to scene illumination so that the two armatures move to their respective "in" positions when the detected scene illumination is within corresponding predetermined intensity ranges.

A so-called light pipe 54, made of colored transparent plastic material, is supported by the mechanism plate with its lower face 55 in rearward alignment with signal lamp 48. The upper end 56 of the light pipe overlaps notch 57 at the lower edge of viewfinder opening 58 and the mechanism plate located behind viewfinder lenses 59 and 60. Hence, illumination from lamp 48 is internally reflected through the light pipe and is visible in the viewfinder whenever the lower face of the light pipe is illuminated by the lamp. A signal vane 61, comprising an extension of diaphragm blade 36, is located between lamp 48 and light pipe face 55 whenever armature 27 is in its "out" position and thereby prevents the lamp from providing a visible signal in the viewfinder. When armature 27 is moved to its "in" position, however, vane 61 assumes a corresponding position, shown in phantom lines in FIG. 2, thus causing the illuminated signal to appear in the viewfinder.

Attenuator vane 62 is pivotally supported to the mechanism plate by stud 63 and is biased upwardly into contact with stop pin 64 by a relatively weak hairpin spring 65. A somewhat stronger coil spring 66 connects the attenuator vane with arm 67 of slide 12 so that manual downward movement of the slide causes spring 65 to move vane 62 to its lower position defined by stop pin 68, as shown in phantom lines in FIG. 2. During such movement, the attenuator vane moves between lamp 48 and light pipe face 55 behind the plane of the signal vane and thereby precludes the appearance of the viewfinder signal regardless of the position of the signal vane.

As the operator commences to depress slide 12, its initial downward movement causes its cam edge 69 to engage cam lug 71 on switch blade 46 and to cam that blade into contact with switch blade 47, thus energizing the signal lamp and the photoresponsive magnet energizing circuit. If scene illumination intensity is below a predetermined low light level, the correspondingly high energization level of the electromagnet will therefore move armature 27 to its "in" position so that signal vane 61 is withdrawn from between signal lamp 48 and light pipe face 55. Therefore, until slide 12 has been depressed sufficiently to move the attenuator vane between the lamp and the light pipe, a signal will appear in the viewfinder to alert the operator to the existence of a low light condition. If scene illumination is above the predetermined low light intensity level, however, armature 27 will remain in its "out" position so that signal vane 61 blocks illumination of the light pipe to preclude the appearance of the viewfinder signal.

After the attenuator vane has disabled the low light signal by obscuring the lower face of the light pipe, the continuing downward movement of slide 12 causes the attenuator vane to move further into alignment with photocell 51 to reduce the area of the photocell which receives illumination from the scene viewed in the viewfinder. When the attenuator vane reaches its lowermost position shown in phantom lines in FIG. 2, the photocell therefore is attenuated to a predetermined fraction of its former sensitivity, for instance, to one-half its former sensitivity. Accordingly, the respective positions of the two armatures and their respective diaphragm blades are then established as a function of the electrical resistance of the attenuated photocell; thereby providing the objective lens with the aperture most compatible with the existing level of scene illumination before the completion of the downward movement of slide 12 effects operation of the camera shutter. Alternatively, as disclosed in the above-identified U.S. Pat. application, Ser. No. 623,088, the final positions of the two armatures can establish the adjustment of a different exposure control element; e.g., a variable speed shutter or an adjustable iris-type diaphragm.

The following data illustrates more specifically the mode of operation of a representative example of the embodiment of the invention described above:

Desired Relation of Scene Illumination to Diaphragm Settings

| Scene brightness (foot lamberts): | Diaphragm settings |
|---|---|
| Less than 250 | [1] f/11 |
| 250–500 | f/11 |
| 500–1,000 | f/16 |
| Over 1,000 | f/22 |

[1] Low light signal.

Response of Armatures to Cell Illumination (Based on Assumption of Each Ten Foot Lamberts of Scene Brightness Produces One Foot Candle of Cell Illumination)

| Cell illumination (foot candles) | Armature positions |
|---|---|
| Less than 25 | Both armatures "In" (f/11) |
| 25–50 | Weak armature "In" and strong armature "Out" (f/16). |
| Over 50 | Both armatures "Out" (f/22). |

Sequence of Functions During Slide Depression Under Different Light Conditions

Case 1:
    Scene brightness under 250 ft.l. (low light condition).
    Cell illumination less than 25 ft. c.
    (Assume 24 ft. c.)
    1. Initial depression closes switch. 24 ft. c. cell illumination. Both armatures "in".
    2. Low light signal unobstructed. Signal visible in viewfinder.
    3. Further depression attenuates to 12 ft. c. Signal light blocked by attenuator vane. Both armatures remain "in".
    4. Final depression effects exposure (underexposed).

Case 2:
    Scene brightness 250–500 ft. l.
    Cell illumination 25–50 ft. c.
    (Assume 30 ft. c.)
    1. Initial depression closes switch. 30 ft. c. cell illumination. Strong armature "out" and wear armature "in".
    2. Low light signal blocked by strong armature vane.
    3. Further depression attenuates cell to 15 ft. c. Low light signal blocked by attenuator vane; both armatures remain "in".
    4. Final depression effects exposure (f/11).

Case 3:
    Scene brightness 500–1,000 ft. l.
    Cell illumination 50–100 ft. c.
    (Assume 60 ft. c.)
    1. Initial depression closes switch. 60 ft. c. cell illumination. Both armatures "out".
    2. Low light signal blocked by strong armature vane.
    3. Further depression attenuates cell to 30 ft. c. Low light signal blocked by attenuator vane; strong armature "out" and weak armature "in".
    4. Final depression effects exposure (f/16).

Case 4:
    Scene brightness over 1,000 ft. l.
    Cell illumination over 100 ft. c.
    (Assume 120 ft. c.)
    1. Initial depression closes switch. 120 ft. c. cell illumination. Both armatures "out".
    2. Low light signal blocked by strong armature vane.
    3. Further depression attenuates cell to 60 ft. c. Low light signal blocked by attenuator vane; both armatures "out".
    4. Final depression effects exposure (f/22).

Figure 4:
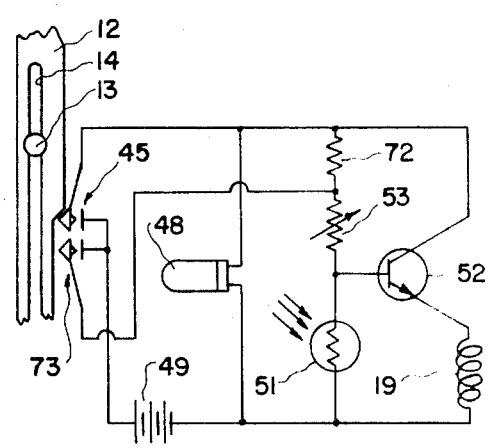
FIG. 4 is a schematic diagram of an electrical circuit corresponding generally to FIG. 3 but comprising an alternate embodiment of the invention.

Rather than varying the sensitivity of the photocell by physically obstructing a portion of its light receiving face, the same objective can be achieved by electrical means by modifying the previously described electrical circuit in a manner shown in FIG. 4. In accordance with this modification, an additional resistor 72 is provided in series with variable resistor 53 and is adapted to be shunted by closing normally open switch 73. The latter switch is similar to switch 45 and is closed by movement of slide 12 to a position corresponding to that at which the previously described attenuator vane is moved to its lowermost position; closing of switch 73 reduces the resistance between the positive terminal of battery 49 and the base of transistor 52 to increase the inverse amplification factor of the magnet energization circuit. If such means are employed, a vane similar to attenuator vance 62 is provided to disable the low light signal but does not obstruct the photocell. Alternatively, the same result could be achieved in a similar manner by means of a resistor adapted to be connected in series with the photocell by the closing of a normally open switch operated by corresponding movement of slide 12.

Similarly, it should be recognized that an alternate embodiment of the invention can employ an electromagnet energized in direct proportion to the illumination of the photocell. In such a case, the positions of resistor 53 and photocell 51 in the circuit would be interchanged; vane 62 would be arranged to completely uncover photocell 51 when the shutter operating slide 12 was completely depressed, vanes 41 and 42 would be closed when the magnet 21 was at maximum energization, and lamp 48 would be blocked when the weaker armature was in its "in" position rather than in its "out" position.

The invention has been described in detail with particular reference to illustrative preferred embodiments thereof, but it will be understood that variations and modifications can be effected within the spirit and scope of the invention.

I claim:

1. For use in a photographic camera including an objective lens having an optical path and a shutter, said camera being adapted to expose a photosensitive medium to a scene, an automatic exposure control and low light signal device comprising:
   a. an electromagnet,
   b. photoresponsive means for detecting scene brightness and energizing said electromagnet as a function of such scene brightness,
   c. a magnetically attractable armature movably supported adjacent said electromagnet and adapted to assume a first position when said electromagnet is energized below a predetermined energization level and a second position when said electromagnet is energized above said predetermined energization level,
   d. sensitivity adjusting means for adjusting said photoresponsive means to
      i. a first condition for establishing a first functional relationship between scene brightness and the energization of said electromagnet and
      ii. a second condition for establishing a second different functional relationship between scene brightness and tne energization of said electromagnet,
   e. a signal means for providing a warning signal in response to the presence of said armature at a predetermined one of said first and second positions while said photoresponsive means is adjusted to said first condition,
   f. an exposure regulating element, and
   g. exposure control means for adjusting said exposure regulating element in accordance with the position of said armature while said photoresponsive means is adjusted to said second condition.

2. An automatic exposure control and low light signal device according to claim 1 including means for disabling said signal means when said photoresponsive means is adjusted to said second condition.

3. An exposure control and low light signal device according to claim 1 in which said sensitivity adjusting means comprises means movable into alignment with said photoresponsive means to reduce the effective sensitivity of said photoresponsive means.

4. An exposure control and low light signal device according to claim 1 in which said exposure regulating element comprises a diaphragm blade carried by said armature for movement therewith into and out of alignment with the optical path of said objective lens.

5. An exposure control and low light signal device according to claim 4 including:
   a. a second magnetically attractable armature movably supported adjacent said electromagnet and adapted to assume a first location when said electromagnet is energized below a second predetermined energization level and a second location when said electromagnet is energized above that second predetermined energization level, and
   b. a second diaphragm blade carried by said second armature and movable therewith into and out of alignment with the optical path of said objective lens.

6. An exposure control and low light signal device according to claim 5 in which said first energization level is above said second energization level.

7. An exposure control and low light signal device according to claim 1 including:
   a. a shutter operating member movable from an inoperative position to an intermediate position and then to a shutter operating position to operate said shutter, and
   b. motion translating means responsive to movement of said shutter operating member for adjusting said sensitivity adjusting means
      i. to said first condition during movement of said shutter operating member from said inoperative position to said intermediate position and
      ii. to said second condition during movement of said shutter operating member from said intermediate position to said shutter operating position.

8. An exposure control and low light signal device according to claim 7 including:
   a. a source of electric current,
   b. normally open switch means movable between an open position and a closed position, said switch means being connected in series with said photoresponsive means to activate said photoresponsive means in response to the closing of said switch means, and
   c. switch operating means for closing said switch means in response to the initial movement of said shutter operating member from said inoperative position toward said intermediate position.

9. An exposure control and low light signal device according to claim 8 in which said signal means comprises:
   a. a viewfinder,
   b. a source of illumination energized by said source of current in response to the closing of said switch means,
   c. means defining a light path between said source of illumination and said viewfinder for rendering light from said source of illumination visible in said viewfinder to provide a low scene light warning signal, and
   d. a vane carried by said armature and adapted to obstruct the path of light between said source of illumination and said viewfinder when said armature is in said first position.

10. An exposure control and low light signal device according to claim 9 in which said photoresponsive means is adapted to energize said electromagnet in inverse proportion to scene brightness.

11. In a camera for exposure of a photosensitive medium to a scene, an exposure control and low scene light level warning device comprising:
   a. photoelectric means for establishing an electric current whose value is related to the level of scene illumination,
   b. electromagnetic means electrically coupled to said photoelectric means for energization thereby,
   c. armature means movable with respect to said electromagnet from a first position to a second position in response to energization thereof, for controlling the exposure of said medium,
   d. actuatable means for varying the sensitivity of said photoelectric means to scene illumination between a first sensitivity value and a second sensitivity value,
   e. means coupled to said armature means for providing a signal when said armature means is in one of said first and second positions,
   f. actuatable means for blocking said signal,
   g. means for initiating exposure, and
   h. means responsive to initiation of exposure by said exposure initiating means for actuating said blocking means and for actuating said sensitivity varying means, so that said armature means can move to said one of said first and second positions without producing said signal.

12. In a camera, an exposure control and low scene light level warning device according to claim 11 wherein:
   a. said armature means comprises at least first and second armatures movable in response to first and second levels of energization of said electromagnet, respectively, said device further comprising
   b. a pair of diaphragm blade means for controlling the exposure of the photosensitive medium, and
   c. means for coupling said armatures to said blade means, respectively, so that movement of said armatures controls the exposure of the photosensitive medium to scene light.